US008469048B2

(12) United States Patent
Bresnahan

(10) Patent No.: US 8,469,048 B2
(45) Date of Patent: Jun. 25, 2013

(54) PRESSURE FEEDBACK SHUTTLE VALVE

(75) Inventor: Kevin L Bresnahan, Avon Lake, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 828 days.

(21) Appl. No.: 12/633,058

(22) Filed: Dec. 8, 2009

(65) Prior Publication Data

US 2010/0147403 A1 Jun. 17, 2010

Related U.S. Application Data

(60) Provisional application No. 61/122,156, filed on Dec. 12, 2008.

(51) Int. Cl.
*G05D 11/00* (2006.01)

(52) U.S. Cl.
USPC .......................... 137/112; 137/115.09; 251/50

(58) Field of Classification Search
USPC .......... 137/111, 112, 115.01, 115.03, 115.04, 137/115.05, 115.08, 115.09, 11, 5.1, 115.13; 251/48, 50, 51
See application file for complete search history.

(56) References Cited

U.S. PATENT DOCUMENTS

| | | | | |
|---|---|---|---|---|
| 3,533,430 | A | 10/1970 | Fredd | |
| 3,642,020 | A | 2/1972 | Payne | |
| 4,253,481 | A | 3/1981 | Sarlls, Jr. | |
| 4,467,825 | A | 8/1984 | Boyd | |
| 4,583,567 | A * | 4/1986 | Arav | 137/115.09 |
| 6,257,268 | B1 | 7/2001 | Hope et al. | |
| 6,318,400 | B1 | 11/2001 | Hope et al. | |
| 6,371,149 | B1 | 4/2002 | Gust et al. | |
| 6,655,405 | B2 | 12/2003 | Hollister et al. | |
| 6,779,543 | B2 | 8/2004 | Hollister et al. | |
| 7,159,605 | B2 | 1/2007 | Thrash, Jr. et al. | |
| 7,243,671 | B2 | 7/2007 | Thrash, Jr. et al. | |

FOREIGN PATENT DOCUMENTS

| | | | |
|---|---|---|---|
| EP | 0611351 | B1 | 5/1995 |
| EP | 0656847 | B1 | 11/1996 |

* cited by examiner

*Primary Examiner* — Eric Keasel

(74) *Attorney, Agent, or Firm* — Robert J. Clark

(57) ABSTRACT

A shuttle valve 10 includes a valve body 11, a first inlet port 12, a second inlet port 13, an outlet port 14, and a shuttle poppet 15. The inlet ports 12 and 13 may be connected to different sources of fluid pressure, and the shuttle valve 10 connects the higher pressure one of the inlet ports 12, 13 to the outlet port 14 and isolates the lower pressure one of the inlet ports 12, 13 from the outlet port 14. First valve members 26, 46 selectively open and close fluid communication between the first inlet port 12 and the outlet port 14. Second valve members 27, 47 selectively open and close fluid communication between the second inlet port 13 and the outlet port 14. The shuttle valve 10 includes cushioning cavities 50 and 51 and feedback passages 56, 59 and 60 to reduce shock or water hammer in the system.

20 Claims, 5 Drawing Sheets

PRESSURE FEEDBACK SHUTTLE VALVE

CROSS REFERENCE TO RELATED APPLICATIONS

The present application claims the benefit of the filing date of U.S. Provisional Patent Application Ser. No. 61/122,156, filed Dec. 12, 2008, the disclosure of which is incorporated herein by reference in its entirety.

TECHNICAL FIELD

This invention relates to a valve with a single outlet port and two fluid pressure inlet ports. The valve includes a shuttle poppet that connects the higher pressure one of the two inlet ports to the outlet port and isolates the lower pressure one of the two inlet ports from the outlet port. This type of valve is referred to as a shuttle valve.

BACKGROUND OF THE INVENTION

When a shuttle valve is used in a fluid system, the two inlet ports of the shuttle valve may be connected to different sources of fluid pressure. The different sources of fluid pressure may be at different pressure levels, and each of the pressure levels may increase or decrease with time. The shuttle poppet of the shuttle valve closes fluid pressure communication between the lower pressure source inlet port and the outlet port. The shuttle poppet also establishes and maintains fluid pressure communication between the higher pressure source inlet port and the outlet port. As used herein, the term fluid pressure communication with reference to two or more surfaces or volumes means that such surfaces or volumes are in relatively open fluid flow communication and/or at substantially similar pressure levels under normal operating conditions when such surfaces or volumes are in the described configuration. The term leakage communication with reference to two or more surfaces or volumes means that such surfaces or volumes are in relatively restricted fluid flow communication and/or at substantially dissimilar pressure levels under normal operating conditions when such surfaces or volumes are in the described configuration. The terms inlet port or inlet and outlet port or outlet do not preclude fluid flow in a reverse direction such that an inlet becomes an outlet or an outlet becomes an inlet, unless the context otherwise so requires.

The shuttle poppet, which may also be referred to as a valve member, may have a first at rest position and a second at rest position. In the first at rest position, the lower fluid pressure source may be connected to the first inlet port and the higher fluid pressure source may be connected to the second inlet port. In this configuration, a first valve surface of the shuttle poppet closes fluid pressure communication between the lower pressure source first inlet port and the outlet port while fluid pressure communication between the higher pressure source second inlet port and the outlet port is established and maintained. In the second at rest position, the relative pressure levels of the first and second inlet ports may reverse, so that the first inlet port may be at the higher pressure level and the second inlet port may be at the lower pressure level. In this configuration, a second valve surface of the shuttle poppet closes fluid pressure communication between the lower fluid pressure source second inlet port and the outlet port while fluid pressure communication between the higher fluid pressure source first inlet port and the outlet port is established and maintained. In this manner, the inlet port that is at the higher pressure level is connected to the outlet port.

The shuttle poppet of the shuttle valve is moved between its first and second at rest positions in response to fluid pressure. More specifically, the shuttle poppet is moved in response to the fluid pressure differential between the first inlet port and the second inlet port. Some shuttle valves may include biasing members to prevent movement of the shuttle poppet until a predetermined pressure differential between the inlet ports is reached.

The pressure differential between the two inlet ports is generally the main determinant of the acceleration and velocity of travel of the shuttle poppet. If a high pressure differential between the inlet ports builds rapidly to move the shuttle poppet from one of its at rest position to its other at rest position, the shuttle poppet may tend to accelerate relatively quickly and move at a rapid velocity and then abruptly stop when its other at rest position is reached. Depending upon the pressure levels, the pressure level differentials, the rate of change of those differentials, the valve and pipe sizes and lengths, the elasticity or capacitance of the system, the resulting speed of movement of the shuttle poppet and other factors, these conditions may produce shock or water hammer in the system as is well known. Also, if the pressure differential between the first and second inlet ports is relatively small and/or it changes in direction rapidly and/or frequently, the shuttle poppet may oscillate back and forth more than necessary for proper system functioning.

Prior art U.S. Pat. No. 7,243,671 discloses a chatter resistant shuttle valve that includes a valve body with a shuttle valve member or poppet movably mounted inside. Dampening or cushioning chambers are provided which dampen movement of the shuttle valve member in each direction.

Shuttle valves of this type may be used in any of several known applications. One such application is in drilling fields in which drilling rigs drill wells into the ground (including underwater surfaces) for locating and connecting to underground fluid resources such as oil or natural gas or for locating and connecting to underground chambers to pump fluids into the chambers for storage. In these uses, the shuttle valve may be used as a component in a blow out preventer circuit that is designed to change fluid flow paths and prevent over pressure conditions that might blow out piping or other components during instances of rapid high pressure build up in the well. A blow out preventer is any fluid circuit that operates in any application to change the path of fluid flow in response to fluid pressure change. A drilling field blow out preventer is any such blow out preventer that is used in connection with well drilling into the ground.

SUMMARY OF THE INVENTION

The present invention provides a valve having first and second inlet ports, an outlet port and a poppet. The poppet has a first at rest position in which the first inlet port is at a lower pressure and is isolated from the outlet port, and a second at rest position in which the second inlet port is at a lower pressure level and is isolated from the outlet port. In each of the at rest positions, the other inlet port is at the higher pressure level and is in fluid communication with the outlet port. The poppet also has intermediate positions between these at rest positions. When the poppet is in an intermediate position, the valve may either (a) connect just one of the inlet ports to the outlet port (which may be called a low interflow valve), or (b) connect both inlet ports to the outlet port (which may be called a high interflow valve).

Movement of the shuttle poppet from the first at rest position to the second at rest position is caused by fluid pressure in the first inlet port increasing and/or by fluid pressure in the second inlet port decreasing, so that the relative pressure levels reverse and the fluid pressure in the second inlet port is lower than the fluid pressure in the first inlet port. The increased relative pressure in the first inlet port acts against the poppet and overcomes the lower pressure in the second inlet port acting against the opposite side of the poppet.

As the valve member or poppet nears its second at rest position for closing the lower pressure second inlet port, a cushioning fluid cavity adjacent the closing second inlet port is formed. The fluid from the cushioning cavity can either exit the cavity toward the outlet port of the valve or be forced back into the second inlet port as the valve member continues to move. The volume of the cushioning cavity reduces or collapses at a controlled rate to cushion the movement of the poppet. The cushioning cavity and cushioning function may also be referred to as dampening. Dampening or cushioning is restricting the velocity or acceleration or deceleration of a moving member during at least a part of its movement.

The cushioning cavity adjacent the lower pressure inlet port is connected to the higher pressure inlet port by a control or feedback passage. By supplying fluid pressure from the higher pressure inlet port continuously into the collapsing cushioning cavity adjacent the other inlet port, shifting of the valve member or poppet from the first at rest position to the second at rest position can be slowed. This reduces the shock as the poppet reaches its second at rest position to close the second inlet port. This structure also reduces the impact of the poppet engaging its seat and dampens oscillation. The valve member or poppet of the present invention includes a feedback passage within the poppet directly connecting the higher pressure inlet port to the cushioning cavity adjacent the lower pressure inlet port, in both directions of movement of the poppet, which provides pressure feedback features for helping to reduce shock during poppet or valve member closing of the second inlet port.

The invention provides various ones of the features and structures described in the claims set out below, alone and in combination, which claims are incorporated by reference in this summary of the invention.

BRIEF DESCRIPTION OF THE DRAWINGS

Embodiments of this invention will now be described in further detail with reference to the accompanying drawings, in which.

DETAILED DESCRIPTION OF THE INVENTION

The principles, embodiments and operation of the present invention are shown in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

Figure 1:
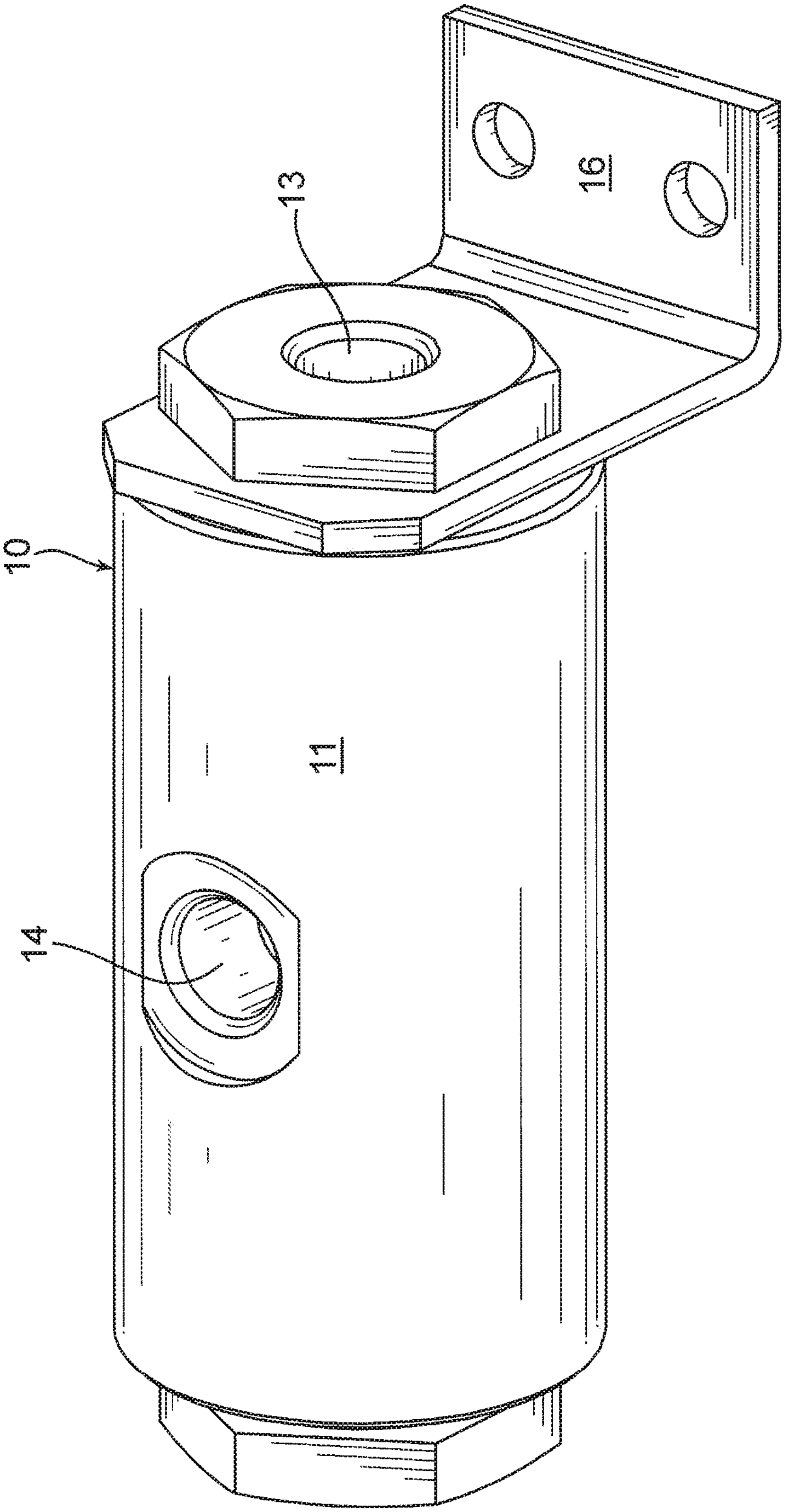
FIG. 1 is perspective view of a presently preferred embodiment of a pressure feedback shuttle valve incorporating certain principles of this invention.
Figure 2:
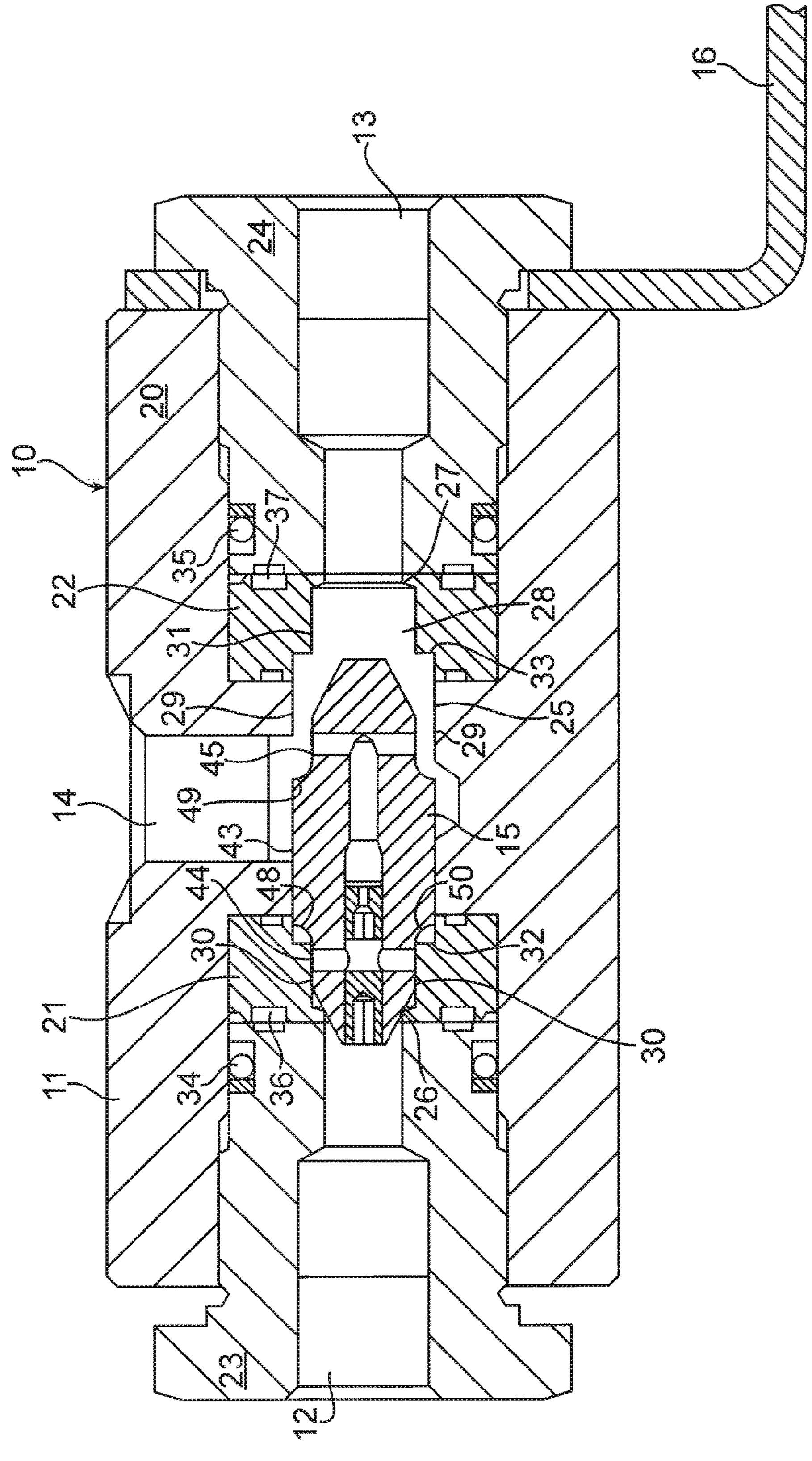
FIG. 2 is a longitudinal cross sectional side elevation view of the pressure feedback shuttle valve shown in FIG. 1, with the shuttle poppet shown in a first at rest position.

A preferred embodiment of a pressure feedback shuttle valve 10 according to the present invention is shown in FIGS. 1 through 5. Referring first to FIGS. 1 and 2, the shuttle valve 10 includes a valve body 11, a first inlet port 12, a second inlet port 13, an outlet port 14, and a shuttle poppet 15. A mounting bracket 16 is provided to secure the shuttle valve 10 to any suitable mounting structure.

The valve body 10 is of any suitable material, and is selected in a well known manner to accommodate the pressures, flow rates, temperatures, fluids, external environment, shuttle valve size, pipe or tube type and size and thread configuration or flange configuration used to connect the valve body 10 to other components, and other factors. In the preferred embodiment, the shuttle valve accommodates, for example, fluid pressures up to 5,000 pounds per square inch and connects with pipe or tubing of ¼ inch through 1½ inch (Society of Automotive Engineers tube sizes 4 through 24). Unless otherwise mentioned or obvious from the description and drawings, the valve body 10 and other metal components other than the shuttle poppet 15 are of machined 316 stainless steel material.

The valve body 10 in the preferred embodiment is constructed from multiple components for ease of machining and assembly, although at least some of the components could be a single piece unitary construction. The valve body 10 includes a main housing 20, two identical valve seat members 21 and 22, and two identical inlet connectors 23 and 24. The main housing 20 is generally cylindrical and includes the outlet port 14, which is a radially extending threaded hole that may be connected to a pipe or tube or other component.

The main housing 20 also includes a machined opening 25 extending axially from end to end through the main housing 20. The machined opening 25 is symmetrical about the outlet port 14, and the outlet port 14 is disposed between the inlet ports 12 and 13. The machined opening 25 includes a first annular valve seat 26 and a second annular valve seat 27. A central cavity 28 of the machined opening 25 extends between the valve seats 26 and 27 and intersects the outlet port 14. The central cavity 28 includes a larger diameter portion 29 and reduced diameter portions 30 and 31. The intersection of the larger diameter portion 29 with the reduced diameter portions 30 and 31 provides annular radial walls 32 and 33.

The valve seat members 21 and 22 are slidably received in the machined opening 25. The valve seat members 21 and 22 are secured in place by the inlet connectors 23 and 24, respectively, which are threaded into threaded end portions of the machine opening 25. Any other suitable structure for securing the valve seat members 21 and 22 and the inlet connectors 23 and 24 in the machined opening 25, such as pressing or otherwise assembling these components, may alternatively be used.

The inlet connectors 23 and 24 each carry a seal device 34 and 35, respectively, to restrict fluid leakage outwardly between the inlet connectors 23 and 24 and the main housing 20 of the valve body 11. Any suitable seal device can be used for the seal devices 34 and 35. In the preferred embodiment shown in the drawings, the seal devices 34 and 35 each include an O-ring of nitrile rubber material and a back up ring of a suitable thermosetting material such as polytetrafluoroethylene. Seal devices 36 and 37, respectively, are provided in the axially outwardly facing radial end faces of the valve seat members 21 and 22, respectively. Again, any suitable seal device can be used for the seal devices 36 and 37. In the preferred embodiment, the seal devices 36 and 37 are sealing rings of a suitable thermosetting material such as polytetrafluoroethylene. On the axially inwardly facing radial end faces of the valve seat members 21 and 22, suitable seals which may be of nitrile rubber material are molded in place in suitable grooves machined in such end faces.

The shuttle poppet 15 is of 17-4 precipitation hardened stainless steel, which has 17% chromium and 4% nickel, known as American Iron and Steel Institute 630 stainless steel. The shuttle poppet 15 includes a larger diameter cylindrical central portion 43, first and second smaller diameter radially outwardly facing cylindrical surfaces or neck portions 44 and 45, and first and second conical nose portions 46 and 47. As further described below, the conical nose portions 46 and 47 provide first and second valve surfaces or valve seats for the shuttle poppet 15. The larger diameter central portion 43 and the smaller diameter surfaces 44 and 45 are connected by annular walls 48 and 49, respectively. As further described below and shown in FIG. 2, the first smaller diameter radially outwardly facing surface 44 of the shuttle poppet 15 and the inwardly facing surface 29 of the valve body 11 and the annular walls 48 and 32 cooperatively define a first variable volume cushioning cavity 50 when the shuttle poppet 15 is in its first at rest position. A controlled annular clearance between the surfaces 43 and 29 extends between the cushioning cavity 50 and the outlet port 14, and a controlled annular clearance between the surfaces 30 and 44 extends between the cushioning cavity 50 and the inlet port 12. These controlled annular clearances provide a leakage fluid flow path for fluid flowing out of the cushioning cavity 50. Similarly, as further described below and shown in FIG. 4, the second smaller diameter radially outwardly facing surface 45 of the shuttle poppet 15 and the radially inwardly facing surface 29 of the valve body 11 and the annular walls 49 and 33 cooperatively define a second variable volume cushioning cavity 51 when the shuttle poppet 15 is in its second at rest position. A controlled annular clearance between the surfaces 43 and 29 extends between the cushioning cavity 51 and the outlet port 14, and a controlled annular clearance between the surfaces 31 and 45 extends between the cushioning cavity 51 and the inlet port 13. These controlled annular clearances provide a leakage fluid flow path for fluid flowing out of the cushioning cavity 51. Also, the interaction of surfaces 31 and 45 and of surfaces 30 and 44 further contribute to the cushioning described below.

As further shown in FIG. 3 and discussed below, a cushioning or feedback or sensing passage 55 is provided within the shuttle poppet 15. The cushioning passage 55 includes an axial communication passage 56 that extends from the left end of the shuttle poppet 15. The axial passage 56 extends along the centerline of the shuttle poppet 15, but other configurations and locations of the communication passage 56 are also contemplated by this invention. The axial communication passage 56 is a blind bore that terminates part way through the poppet 15, and the left end of the axial passage 56 is closed and sealed by a plug 57. The plug 57 is threaded into a threaded left end of the passage 56 and secured with an elastomeric thread lock product. The plug 57 may alternatively be pressed into the passage 56 or assembled in any other suitable manner. An orifice 58 is threaded into the threaded left end of the passage 56 prior to threading the plug 57 into the passage 56 and is secured with an elastomeric thread lock product. The orifice 58 may alternatively be press fit into the passage 56 or assembled in any other suitable manner. The orifice 58 is a plug that includes a central axially extending through hole that provides a smaller diameter flow restriction within the axial passage 56, to restrict and reduce flow through the passage 56. The cushioning passage 55 also includes first and second radially extending passages or openings 59 and 60 that each provide diametrically opposite flow ports, which extend from the axial passage 56 to the cylindrical surfaces 44 and 45, respectively, and terminate at an opening in such surfaces. The shuttle poppet 15 is not restricted against rotation in the central cavity 28, and the radial passages 59 and 60 may extend parallel to the outlet port 14 or perpendicular to the outlet port 14 or in any other direction. Also, the configuration and number of radial passages may be different from that shown in the preferred embodiment illustrated in the drawings. The axial communication passage is formed by drilling axially into the nose portion 46 along the centerline of the poppet 15 until the communication passage 56 connects the sensing holes or radial portions 59 and 60.

Referring again to FIG. 2, the shuttle poppet is shown in its first at rest position. In this position, the fluid pressure in the second inlet port 13 is higher than the fluid pressure in the first inlet port 12. The higher pressure in the second inlet port 13 acts against the shuttle poppet 15 and retains the shuttle poppet 15 in this first at rest position. In this position, the nose or valve seat or valve surface 46 engages the valve seat or valve surface 26 to isolate the lower pressure first inlet port 12. The second valve surface 27 of the valve body 11 is spaced from its associated valve surface 47 of the shuttle poppet 15, to provide fluid pressure communication from the second inlet port 13 to the outlet port 14.

Figure 3:
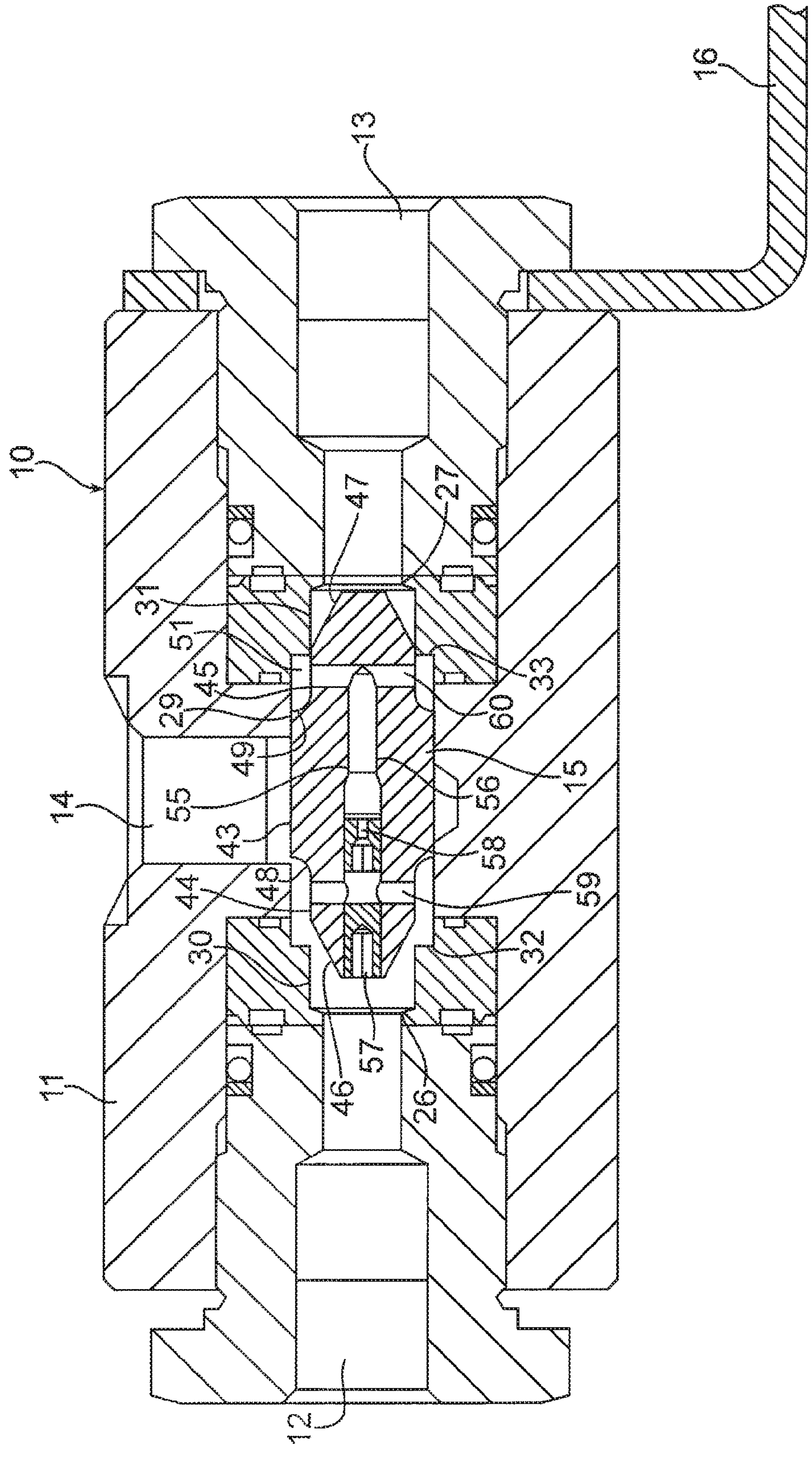
FIG. 3 is a view similar to FIG. 2, but with the shuttle poppet shown in an intermediate position.

When the fluid pressure in the first inlet port 12 increases to a pressure level above that in the second inlet port 13, the shuttle poppet 15 begins to move from its first at rest position shown in FIG. 2 to an intermediate position shown in FIG. 3. The higher fluid pressure in the first inlet port 12 acting against the net lateral cross sectional area of the poppet 15 exposed to such higher pressure in the inlet port 12 overcomes the opposing force created by the lower fluid pressure in the second inlet port 13 acting against the net lateral cross sectional area of the poppet 15 exposed to such lower pressure. This unseats the valve surfaces 26 and 46 and exposes a larger diameter area of the shuttle poppet 15, which is an area equal to the net lateral cross sectional area of the cylindrical portion 44, to the higher fluid pressure in the inlet port 12. As discussed above, the acceleration and velocity of this movement is dependent upon a variety of factors, with the pressure differential between the first inlet port 12 and the second inlet port 13 being a primary determinant.

Referring now to FIG. 3, as this movement continues, on the left side of the shuttle poppet 15 the smaller diameter portion 44 of the shuttle poppet 15 moves out of the reduced diameter portion 30 of the valve body 11. This exposes a still larger diameter area of the shuttle poppet 15, which is an area equal to the net lateral cross sectional area of the cylindrical portion 43, to the higher fluid pressure to the inlet port 12. Also, this opens the radial portion 59 of the feedback passage 55 to the fluid pressure in the inlet port 12.

Still referring to FIG. 3, on the right side of the shuttle poppet 15, the smaller diameter portion 45 of the shuttle poppet 15 moves out of radial alignment with the outlet port 14 to isolate the lower pressure second inlet port 13 from the outlet port 14. After this occurs, the smaller diameter portion 45 then moves into the reduced diameter portion 31 of the valve body 20 to fully define the second cushioning cavity 51. When this occurs, the feedback passage 55 communicates the higher fluid pressure from the inlet port 12 to the second cushioning cavity 51. This supply of fluid pressure from the higher pressure inlet port 12 to the cushioning cavity 51 acts against the net lateral cross sectional area of the annular wall 49 of the shuttle poppet 15 and cushions the movement of the shuttle poppet 15 toward the second valve seat 27 as the shuttle poppet 15 continues its movement from its intermediate position shown in FIG. 3 to its second at rest position shown in FIG. 4. The volume of the cushioning cavity 51 is variable and is reduced as the shuttle poppet 15 continues its movement from the intermediate position shown in FIG. 3 to its second at rest position shown in FIG. 4. The fluid in the cushioning cavity 51 may leak to the outlet port 14 or to the second inlet port 13, and the cushioning cavity 51 attains its minimum volume when the shuttle poppet reaches the second at rest position shown in FIG. 4.

Figure 4:
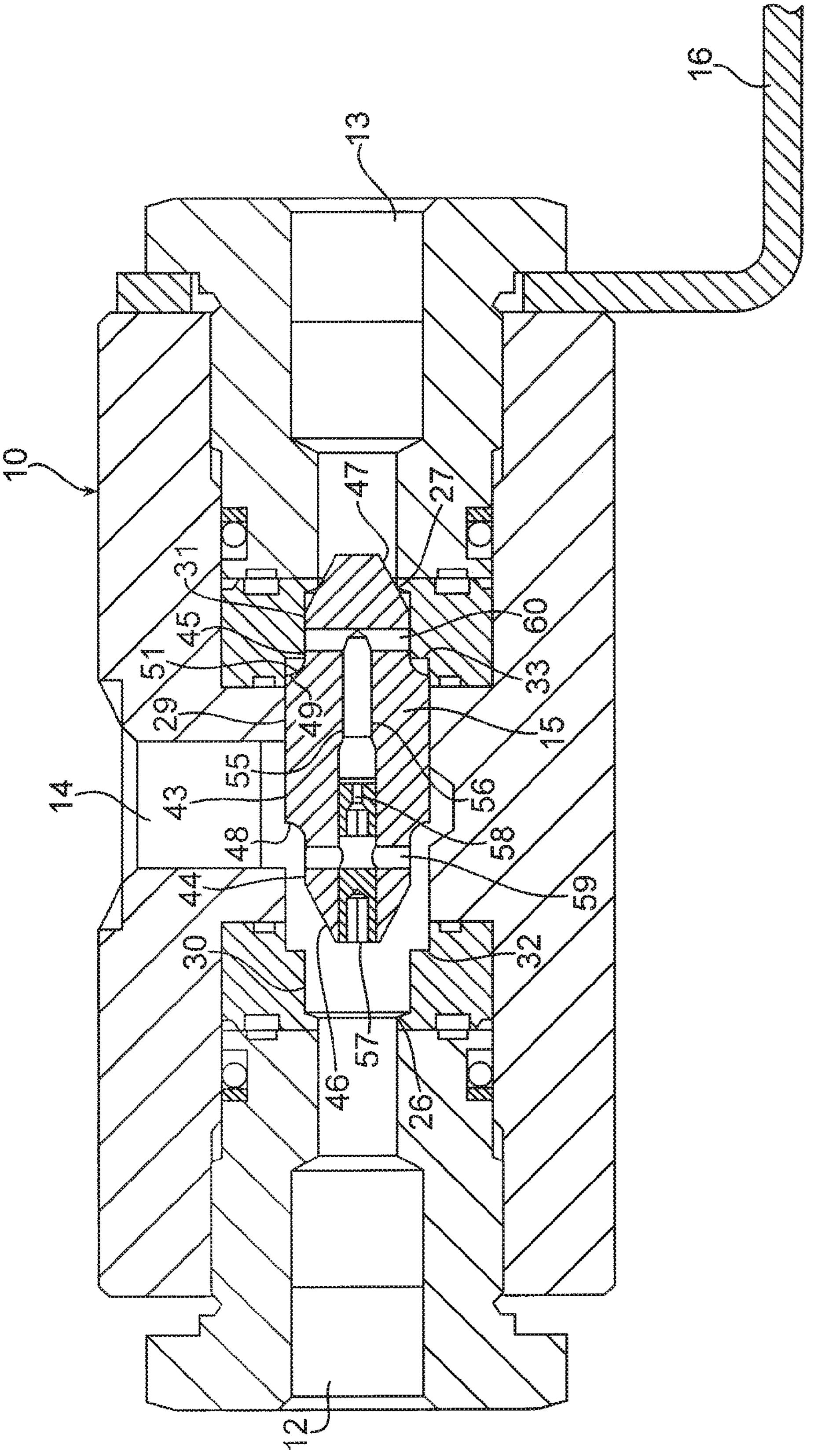
FIG. 4 is a view similar to FIG. 2, but with the shuttle poppet shown in a second at rest position.

By communicating the higher fluid pressure from the inlet port 12 into the cavity 51 while the cavity 51 is collapsing due to the movement of the valve member or poppet 15, positive pressure is maintained in the cavity 51 during the remainder of its movement from the intermediate position shown in FIG. 3 to its second at rest position shown in FIG. 4. As a result, cushioning is maintained in the cavity 51. Rather than just allowing the fluid in the cavity 51 to exit at one rate, the supply of fluid to the cavity 51 is maintained, and the higher pressure fluid from the inlet port 12 slows the valve member 15 as the valve member 15 approaches a stop. This slowing of the valve member reduces its impact on its stop or seat 27 and also dampens oscillation. The orifice 58 also may be used to help dampen oscillation.

Referring now to FIG. 4, the shuttle poppet 15 reaches its second at rest position when the valve surface 47 of the shuttle poppet engages its associated valve surface 27 of the valve body 11. In this second at rest position, the radial portion 60 of the feedback passage 55 is closed by the reduced diameter portion 31. The velocity of the shuttle poppet when the valve surfaces 47 and 27 engage is cushioned in direct proportion to the magnitude of the differential between the higher fluid pressure in the inlet port 12 and the lower fluid pressure in the inlet port 13, so that the cushioning is greater when this fluid pressure differential is higher. The valve surfaces 26 and 46 in this position are separated, establishing fluid communication between the inlet port 12 and the outlet port 13. When the shuttle valve 10 is used as a component in a blow out preventer circuit or oil field blow out preventer circuit, the high fluid pressure from the inlet port 12 may flow to the outlet port 14.

The above description of the operation of the shuttle valve 10 is also generally applicable to the operation of the shuttle valve 10 when the shuttle valve 10 starts from and moves from its second at rest position shown in FIG. 4 through an intermediate position and back to its first at rest position shown in FIG. 2. In this case, the fluid pressure differential changes back to that explained above with reference to the first at rest position shown in FIG. 2. The pressure differential reverses and the inlet port 13 again becomes the higher pressure inlet port. This higher pressure in the inlet port 13 causes the shuttle poppet 15 to begin its movement to the left, and the valve surface 47 moves away from the valve surface 27 to open the valve. As the movement of the shuttle poppet 15 continues its movement to the left back toward the first at rest position shown in FIG. 2, the first cushioning cavity 50 is again formed in an intermediate position. The higher fluid pressure from the inlet port 13 in this case is communicated to the cushioning cavity 50 to cushion the travel of the shuttle poppet 15 toward its associated valve surface 26 on the valve body 11.

When the orifice 58 is included in the feedback passage 55, the feedback communication from the higher pressure inlet port 12 to the cushioning cavity 51 during movement of the shuttle poppet 15 to the right to open the inlet port 12, and the fluid communication from the inlet port 13 to the cushioning cavity 50 during movement of the shuttle poppet 15 to the left to open the inlet port 13, may be more precisely controlled to more precisely control the velocity of the shuttle poppet 15 when the valve surfaces 47 and 27 or the valve surfaces 46 and 26 engage. The orifice 58 may be a separate component as shown in the drawings, to permit various size orifices to be tried in order to tune the shuttle valve 10 to obtain optimum desired results for the system in which the shuttle valve 10 is used. After that is done and the preferred size orifice 58 is determined for such system, the orifice 58 may be integral with the shuttle poppet 15 for ease and efficiency of manufacture.

Figure 5:
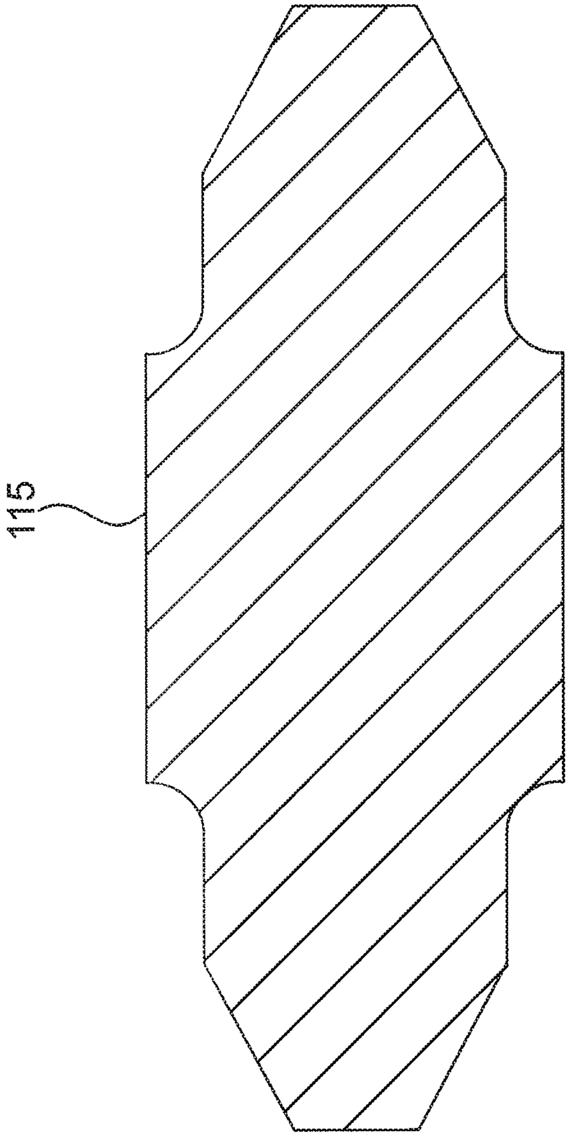
FIG. 5 (PRIOR ART)
FIG. 5 is a longitudinal cross sectional side elevation view of a prior art shuttle poppet that may be used in a shuttle valve.

FIG. 5 shows an alternative shuttle poppet 115 that may be used in the shuttle valve 10 in place of the shuttle poppet 15. The shuttle poppet 115 does not provide the fluid pressure feedback passages for the cushioning cavities according to the present invention and is a solid monolithic prior art shuttle poppet. When the shuttle poppet 115 is used in place of the shuttle poppet 15, any feedback passages for the cushioning cavities as may be provided according to the present invention would be incorporated in the housing 11 and/or in the other components of the shuttle valve 10. Such alternative arrangement may be more difficult to produce and is not illustrated in the drawings but is within the scope of certain aspects of the present invention.

Presently preferred embodiments of the invention are shown and described in detail above. The invention is not, however, limited to these specific embodiments. Various changes and modifications can be made to this invention without departing from its teachings, and the scope of this invention is defined by the claims set out below. Also, while the terms first and second are used to more clearly describe the structure and operation of the shuttle valve 10, it should be understood these terms are used only for purposes of clarity and may be interchanged when referring to different sides of the shuttle valve 10.

What is claimed is:

1. A shuttle valve comprising:

a valve body having first and second inlets and an outlet and a central cavity located between said first and second inlets;

a shuttle poppet located in said cavity and movable between a first position and a second position and intermediate positions between said first and second positions, said shuttle poppet including a first valve surface between said first inlet and said outlet, said first valve surface in said first position contacting a surface of said valve body to close fluid pressure communication between said first inlet and said outlet, said shuttle poppet including a second valve surface between said second inlet and said outlet, said second valve surface in said second position contacting another surface of said valve body to close fluid pressure communication between said second inlet and said outlet, a variable volume cushioning cavity, said cushioning cavity being defined by surfaces of said shuttle poppet and surfaces of said valve body as said shuttle poppet moves from said first position to said intermediate positions to said second position, said shuttle poppet including a first net lateral cross sectional area exposed to fluid pressure in said first inlet port and a second net lateral cross sectional area exposed to fluid pressure in said second inlet port and a third net lateral cross sectional area exposed to fluid pressure in said cushioning cavity when said shuttle poppet is in at least one of said intermediate positions, fluid pressure in said cushioning cavity acting against said third net cross sectional area in a direction to cushion movement of said shuttle poppet from said intermediate positions toward said second position, and at least one feedback passage establishing fluid pressure communication between said first inlet and said cushioning cavity during at least a portion of said movement of said shuttle poppet from said intermediate positions to said second position.

2. A shuttle valve as set forth in claim 1, wherein said outlet is disposed between said first inlet and said second inlet, and said cushioning cavity is disposed between said second inlet and said outlet.

3. A shuttle valve as set forth in claim 2, wherein said cushioning cavity is disposed between said second valve surface and said outlet.

4. A shuttle valve as set forth in claim 3, wherein said cushioning cavity is defined by a radially inwardly facing surface of said central cavity and by a radially outwardly facing surface of said shuttle poppet and by said third net lateral cross sectional area.

5. A shuttle valve as set forth in claim 4, wherein at least a portion of said feedback passage is disposed within said shuttle poppet, and said radially inwardly facing surface and said radially outwardly facing surface define an annular leakage flow path extending from said cushioning chamber.

6. A shuttle valve as set forth in claim 5, wherein the entirety of said feedback passage is disposed within said shuttle poppet, said feedback passage includes an axially extending passage portion and a radially extending passage portion, and said radially extending passage portion extends between said axially extending portion and said cushioning cavity.

7. A shuttle valve as set forth in claim 2, wherein said cushioning cavity is defined between radially opposite surfaces of said central cavity and said shuttle poppet and by said third net lateral cross sectional area, said cushioning cavity being in fluid communication with said second inlet when said shuttle poppet is in said intermediate position, and radially opposing surfaces of said cushioning cavity being spaced apart to allow variations of the volume of said cushioning cavity and to allow only restricted fluid leakage communication between said cushioning cavity and at least one of said second inlet and said outlet when said shuttle poppet is in said intermediate position.

8. A shuttle valve as set forth in claim 7, wherein said volume is at a minimum volume when said shuttle poppet is in said second at rest position.

9. A shuttle valve as set forth in claim 1, including a fluid flow orifice in said feedback passage restricting flow through said passage.

10. A shuttle valve comprising:

a valve body having first and second inlets and an outlet;

a shuttle poppet movable between a first at rest position and a second at rest position and intermediate positions between said first and second at rest positions, said shuttle poppet including a first valve surface between said first inlet and said outlet, said first valve surface in said first at rest position contacting a surface of said valve body to close fluid pressure communication between said first inlet and said outlet, said first valve surface in some of said intermediate positions and in said second at rest position being spaced from said contacted surface of said valve body to open fluid pressure communication between said first inlet and said outlet, said shuttle poppet including a second valve surface between said second inlet and said outlet, said second valve surface in said second at rest position contacting another surface of said valve body to close fluid pressure communication between said second inlet and said outlet, said second valve surface in at least some of said intermediate positions and in said first at rest positions being spaced from said second mentioned contacted surface of said valve body to open fluid pressure communication between said second inlet and said outlet, a variable volume cushioning cavity, said variable volume cushioning cavity being defined by moving surfaces of said shuttle poppet and stationary surfaces of said valve body as said shuttle poppet moves from some of said intermediate positions to said second position, said shuttle poppet including a net lateral cross sectional area exposed to fluid pressure in said cushioning cavity when said shuttle poppet is in some of said intermediate positions and facing in a direction so that fluid pressure in said cushioning cavity acting against said net cross sectional area imposes a force on said shuttle poppet in a direction to cushion movement of said shuttle poppet from some of said intermediate positions toward said second position, and a passage establishing fluid pressure communication between said first inlet and said cushioning cavity during at said movement of said shuttle poppet from some of said intermediate positions to said second position.

11. A shuttle valve as set forth in claim 10, wherein at least a portion of said feedback passage is disposed within said shuttle poppet.

12. A shuttle valve as set forth in claim 10, wherein the entirety of said feedback passage is disposed within said shuttle poppet, said feedback passage includes an opening on the outer surface of said shuttle poppet, said valve body includes a closing surface, said opening is axially spaced from said closing surface of said valve body and is in fluid pressure communication with said cushioning cavity when said shuttle poppet is in at least some of said intermediate positions, and said opening is in radial alignment with said closing surface of said valve body and is in fluid leakage communication with said cushioning cavity and with said outlet when said poppet is in said second at rest position.

13. A shuttle valve as set forth in claim 12, wherein the entirety of said feedback passage is disposed within said shuttle poppet, and said feedback passage includes a fluid flow orifice restricting flow through said passage.

14. A shuttle valve as set forth in claim 13, wherein said cushioning cavity is a variable volume cavity, and said volume is at a minimum volume when said shuttle poppet is in said second at rest position.

15. A shuttle valve as set forth in claim 14, wherein said outlet is disposed between said first inlet and said second inlet, and said cushioning cavity is disposed between said second valve surface and said outlet.

16. A shuttle valve as set forth in claim 15, wherein said cushioning cavity is defined between radially opposite cylindrical surfaces of said valve body and said shuttle poppet and by said net lateral cross sectional area, said cushioning cavity being in fluid communication with second inlet when said shuttle poppet is in some of said first intermediate positions, and radially opposing surfaces of said cushioning cavity defining an annular controlled leakage path to allow variations of the volume of said cushioning cavity and to allow only restricted fluid leakage between said cushioning cavity and at least one of said second inlet and said outlet when said shuttle poppet is in some of said intermediate positions.

17. A shuttle valve comprising:

a valve body having first and second inlets and an outlet, a shuttle poppet movable between a first at rest position and a second at rest position and intermediate positions between said first and second at rest positions, said shuttle poppet including a first valve surface between said first inlet and said outlet, said first valve surface in said first at rest position contacting a surface of said valve body to close fluid pressure communication between said first inlet and said outlet, said first valve surface in said intermediate positions and in said second at rest position being spaced from said contacted surface of said valve body to open fluid pressure communication between said first inlet and said outlet, said shuttle poppet including a second valve surface between said second inlet and said outlet, said second valve surface in said second at rest position contacting another surface of said valve body to close fluid pressure communication between said second inlet and said outlet, said second valve surface in said intermediate positions and in said first position being spaced from said second mentioned contacted surface of said valve body to open fluid pressure communication between said first inlet and said outlet, a first variable volume cushioning cavity, said first variable volume cushioning cavity being defined by moving surfaces of said shuttle poppet and stationary surfaces of said valve body as said shuttle poppet moves between said intermediate positions and said first at rest position, said first variable volume cushioning cavity being disposed between said first valve surface and said outlet, said shuttle poppet including a net lateral cross sectional area exposed to fluid pressure in said first cushioning cavity when said shuttle poppet is in at least one of said intermediate positions and facing in a direction so that fluid pressure in said first cushioning cavity acting against said net cross sectional area imposes a force on said shuttle poppet in a direction to cushion movement of said shuttle poppet from said intermediate positions toward said first position, a passage establishing fluid pressure communication between said second inlet and said first cushioning cavity during at least a portion of said movement of said shuttle poppet from said intermediate positions to said first position, a second variable volume cushioning cavity, said second variable volume cushioning cavity being defined by other moving surfaces of said shuttle poppet and other stationary surfaces of said valve body as said shuttle poppet moves between said intermediate positions and said second at rest position, said second variable volume cushioning cavity being disposed between said second valve surface and said outlet, said shuttle poppet including another net lateral cross sectional area exposed to fluid pressure in said second cushioning cavity when said shuttle poppet is in at least one of said intermediate positions and facing in a direction so that fluid pressure in said second cushioning cavity acting against said other net cross sectional area imposes a force on said shuttle poppet in a direction to dampen movement of said shuttle poppet from said intermediate positions toward said second at rest position, said passage also establishing fluid pressure communication between said first inlet and said second cushioning cavity during at least a portion of said movement of said shuttle poppet from said intermediate positions to said second position, and at least a portion of said feedback passage being disposed within said shuttle poppet.

18. A shuttle valve as set forth in claim 17, wherein the entirety of said feedback passage is within said shuttle poppet.

19. A shuttle valve as set forth in claim 18, including a fluid flow orifice in said feedback passage restricting flow through said passage.

20. A shuttle valve as set forth in claim 19, wherein said first and second cushioning cavities are defined between radially opposite cylindrical surfaces of said valve body and said shuttle poppet and by said respective first and second net lateral cross sectional areas, radially opposing surfaces of said first cushioning cavity being axially slidable relative to one another and defining an annular controlled leakage path to allow variations of the volume of said first cushioning cavity and to provide restricted fluid leakage communication between said first cushioning cavity and at least one of said first inlet and said outlet when said shuttle poppet is in at least one of said intermediate positions, radially opposing surfaces of said second cushioning cavity being axially slidable relative to one another and defining an annular controlled leakage path to allow variations of the volume of said second cushioning cavity and to provide restricted fluid leakage between said second cushioning cavity and at least one of said second inlet and said outlet when said shuttle poppet is in at least one of said second intermediate positions.

* * * * *